US010227056B2

(12) United States Patent
Sherwood et al.

(10) Patent No.: US 10,227,056 B2
(45) Date of Patent: Mar. 12, 2019

(54) AIRBAG TESTING APPARATUS

(71) Applicant: Ford Global Technologies, LLC, Dearborn, MI (US)

(72) Inventors: William Moore Sherwood, Royal Oak, MI (US); Nitesh Chandrakant Jadhav, Canton, MI (US); Harikrishna Devaraj, Northville, MI (US); Jeffrey Berliner, Canton, MI (US); Tyler Glenn, Ypsilanti, MI (US); Kevin Berington Johnson, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 170 days.

(21) Appl. No.: 15/264,161

(22) Filed: Sep. 13, 2016

(65) Prior Publication Data

US 2018/0072260 A1     Mar. 15, 2018

(51) Int. Cl.
*B60R 21/231*     (2011.01)
*G01M 17/007*     (2006.01)
*B60R 21/232*     (2011.01)

(52) U.S. Cl.
CPC ...... *B60R 21/23138* (2013.01); *B60R 21/232* (2013.01); *G01M 17/0078* (2013.01)

(58) Field of Classification Search
USPC ............................................. 73/12.07, 12.09
See application file for complete search history.

(56) References Cited

U.S. PATENT DOCUMENTS 5,483,845 A *   1/1996   Stein ................. G01M 17/0078
                                                               73/12.01
5,485,758 A    1/1996   Brown
(Continued)

FOREIGN PATENT DOCUMENTS

CN     201852753 U    6/2011
CN     202305168 U    7/2012
(Continued)

OTHER PUBLICATIONS

UKIPO Search Report under Section 17(5) for Application No. GB1702529.7 dated Jul. 12, 2017 (4 pages).
(Continued)

*Primary Examiner* — Clayton E Laballe
*Assistant Examiner* — Warren K Fenwick
(74) *Attorney, Agent, or Firm* — Frank A. MacKenzie; Bejin Bieneman PLC

(57) ABSTRACT

A test apparatus includes a linear-motion generator, an airbag, a plate, an anthropomorphic test device, a crushable member, and a guide bar. The linear-motion generator is deployable in a deployment direction. The airbag is spaced from the linear-motion generator and inflatable from an uninflated position to an inflated position. The plate and the anthropomorphic test device are movable together by the linear-motion generator. The crushable member is fixed relative to the airbag in the uninflated position and disposed in the deployment direction from the plate. The guide bar has an end fixed relative to the airbag in the uninflated position and is positioned to intersect the airbag in the inflated position. The test apparatus has a beltline bar that is elongated along an axis transverse to the deployment direction, adjacent the airbag in the uninflated position, and spaced farther from the linear-motion generator than the airbag in the inflated position.

19 Claims, 6 Drawing Sheets

(56) References Cited

U.S. PATENT DOCUMENTS

| | | | |
|---|---|---|---|
| 5,652,375 A | 7/1997 | Da Re | |
| 6,023,984 A | 2/2000 | Mazur et al. | |
| 6,672,177 B2 | 1/2004 | Hutchenreuther et al. | |
| 7,204,165 B1 | 4/2007 | Plaga et al. | |
| 7,216,557 B2 | 5/2007 | David et al. | |
| 7,543,475 B2 | 6/2009 | Rieser et al. | |
| 7,610,821 B2 * | 11/2009 | Klein | G01M 17/0078 73/865.3 |
| 7,770,917 B2 * | 8/2010 | Henderson | B60R 21/232 280/730.2 |
| 9,046,441 B2 | 6/2015 | Kobayashi et al. | |
| 2008/0016970 A1 | 1/2008 | Klein | |
| 2017/0241861 A1 * | 8/2017 | Aekbote | B60R 21/232 |

FOREIGN PATENT DOCUMENTS

| | | |
|---|---|---|
| CN | 103439075 A | 12/2013 |
| CN | 204479258 U | 7/2015 |
| CN | 105004502 A | 10/2015 |
| CN | 204882023 U | 12/2015 |
| DE | 19750157 A1 | 5/1998 |
| DE | 10109375 A1 | 9/2002 |
| EP | 0660097 A2 | 6/1995 |
| GB | 2548478 A | 9/2017 |
| KR | 20000061161 | 10/2000 |
| KR | 20090052004 A | 5/2009 |

OTHER PUBLICATIONS

Non-Final Office Action dated Oct. 20, 2017 for U.S. Appl. No. 15/047,922 (34 pages).
UK Search Report re GB Application No. 1714589.7 dated Jan. 31, 2018.

* cited by examiner

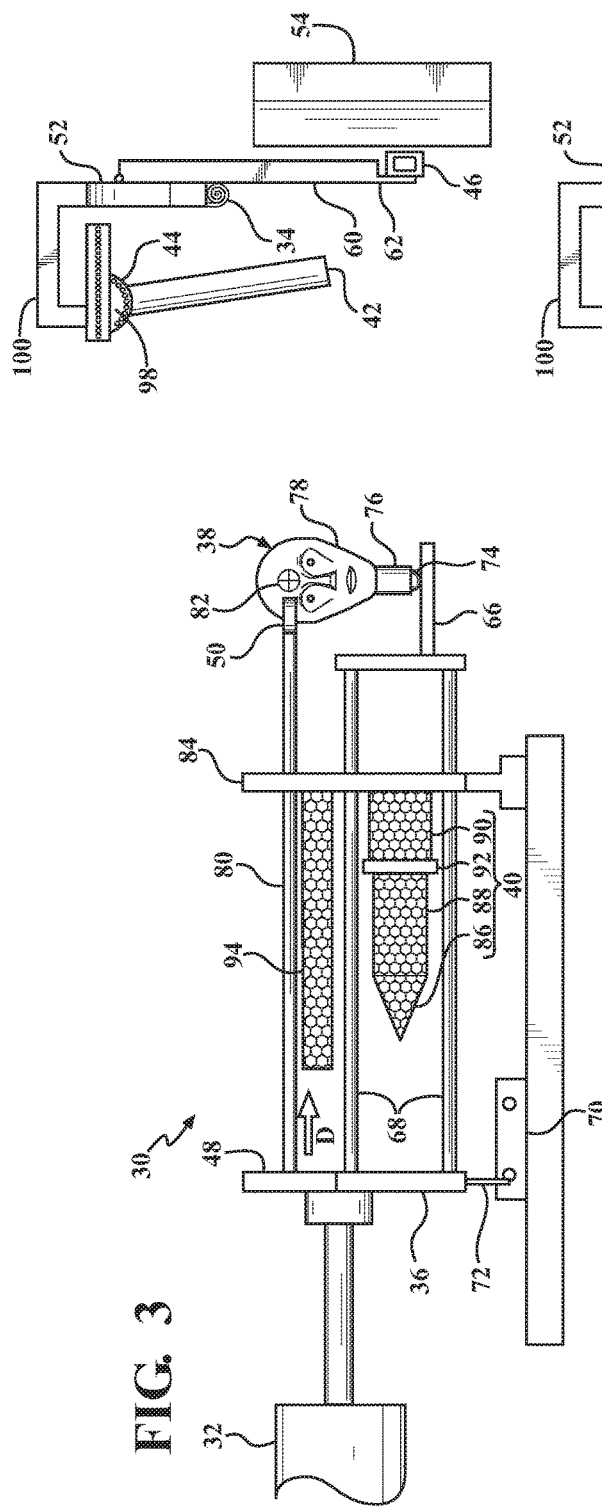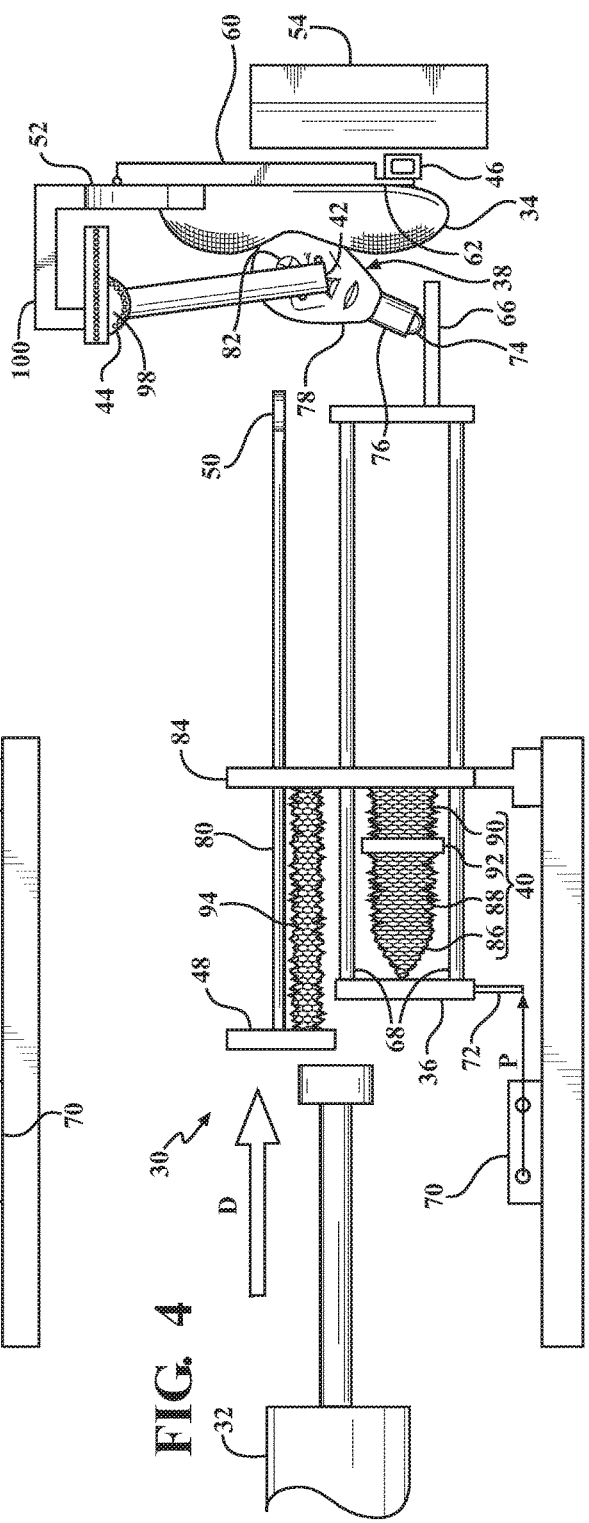

AIRBAG TESTING APPARATUS

BACKGROUND

Vehicles may be subject to side impact testing standards. One type of evaluation of a curtain airbag system in a side impact test mode involves a moving deformable barrier (MDB). As one example, the Federal Motor Vehicle Safety Standard (FMVSS) 214 provides a test procedure designed to simulate a vehicle experiencing a side impact collision. The test procedure provides that a barrier constructed of aluminum honeycomb collide with a side of the test vehicle at an angle of 63° relative to the vehicle-forward direction and a speed of 33.5 miles per hour while the test vehicle holds a test dummy as an occupant. The Lateral Impact New Car Assessment Program (LINCAP) provides a similar test but with a moving deformable cart speed of 38.5 miles per hour. Another example of a side impact barrier test with a moving deformable cart is the Insurance Institute for Highway Safety (IIHS) Side Impact Crashworthiness Evaluation. This test procedure provides that a barrier constructed of an aluminum honeycomb, different than that of FMVSS 214, collide with a side of the test vehicle at an angle of 90° relative to the vehicle-forward direction and a speed of 31.1 miles per hour while the test vehicle holds a test dummy as an occupant. FMVSS 214, LINCAP, and IIHS all set forth requirements for head injury criterion (HIC), which is a function of the acceleration over time of the center of gravity of the head of the dummy.

One measure of injury for this test is the head injury criterion (HIC). The HIC is a function of the acceleration of a head of a passenger or dummy during an impact, specifically, $$HIC = \left\{ \left[ \frac{1}{t_2 - t_1} \int_{t_1}^{t_2} a(t) dt \right]^{2.5} (t_2 - t_1) \right\}_{max},$$

in which $t_1$ and $t_2$ are the initial and final times measured in seconds during which the HIC reaches a maximum value and a is acceleration of the head measured in gs. Another measure of injury is the brain injury criterion (BrIC). The BrIC is a function of angular velocity of a head of a test dummy during an impact, specifically, $$BrIC = \sqrt{\left(\frac{max(|\omega_x|)}{\omega_x c}\right)^2 + \left(\frac{max(|\omega_y|)}{\omega_y c}\right)^2 + \left(\frac{max(|\omega_z|)}{\omega_z c}\right)^2}.$$

These side impact testing standards are performed on a full vehicle equipped with side airbag restraints, such as side curtain airbags. Multiple tests may be run to optimize or refine the design of the vehicle, requiring a new vehicle to be tested for each test run.

BRIEF DESCRIPTION OF THE DRAWINGS

FIG. 3 is a side view of the test apparatus before running a test.
FIG. 4 is a side view of the test apparatus upon completion of a test.

DETAILED DESCRIPTION

Figure 1:
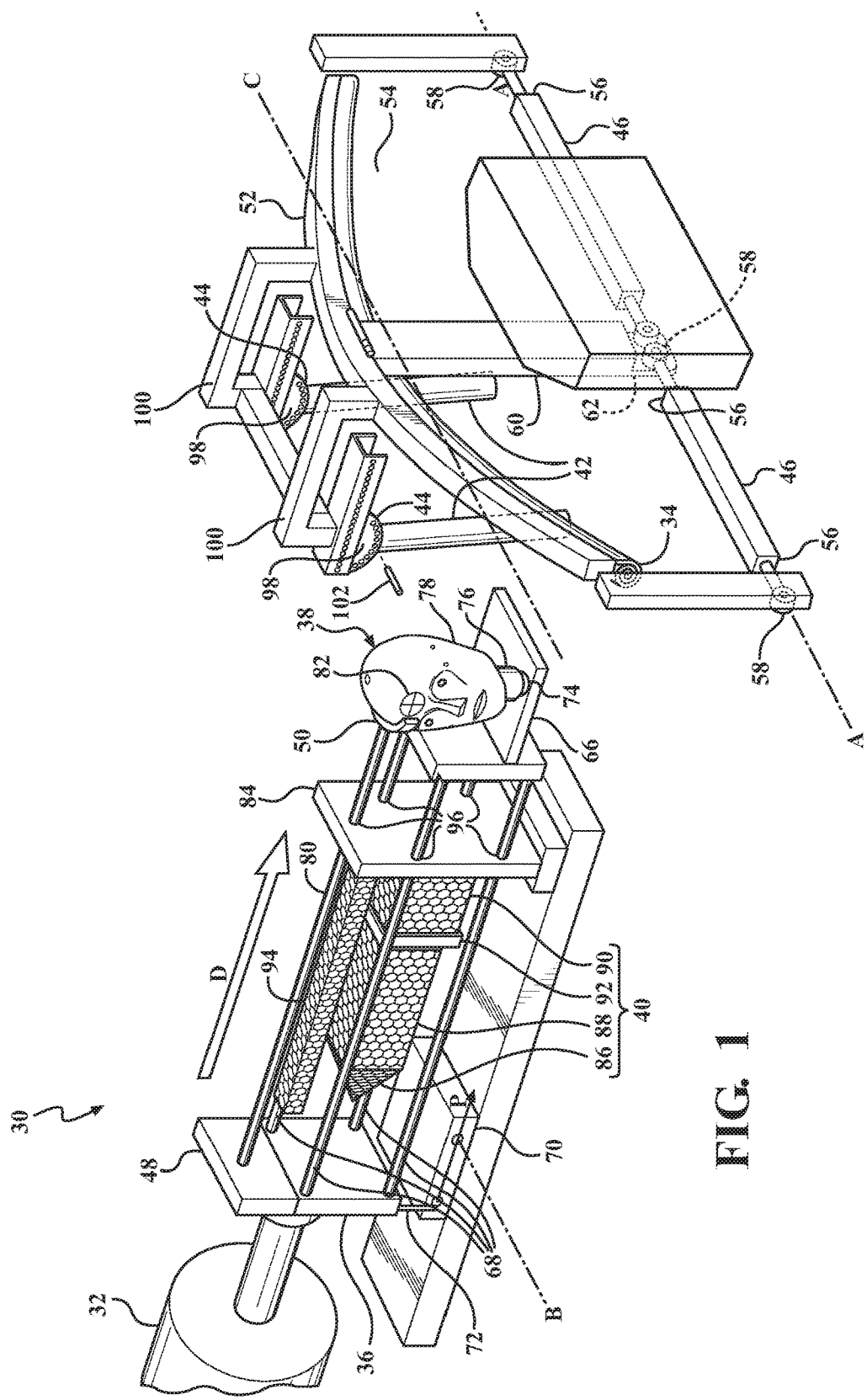
FIG. 1 is a perspective view of a test apparatus.

With reference to the Figures, wherein like numerals indicate like parts throughout the several views, a test apparatus 30 includes a linear-motion generator 32, an airbag 34, a plate 36, an anthropomorphic test device 38, a crushable member 40, and a guide bar 42. The linear-motion generator 32 is deployable in a deployment direction D. The airbag 34 is spaced from the linear-motion generator 32 and inflatable from an uninflated position to an inflated position. The plate 36 and the anthropomorphic test device 38 are movable together by the linear-motion generator 32. The crushable member 40 is fixed relative to the airbag 34 in the uninflated position and disposed in the deployment direction D from the plate 36. The guide bar 42 has an end 44 fixed relative to the airbag 34 in the uninflated position, and the guide bar 42 is positioned to intersect the airbag 34 in the inflated position. The test apparatus 30 may also have a beltline bar 46 elongated along an axis A transverse to the deployment direction D and adjacent the airbag 34 in the uninflated position. The beltline bar 46 may be spaced farther from the linear-motion generator 32 than the airbag 34 in the inflated position.

The test apparatus 30 has a smaller footprint than running a full-vehicle high-speed side impact or moving deformable barrier test according to, for example, FMVSS 214, UNCAP, EuroNCAP, or IIHS. The test run on the test apparatus 30 does not entail the testing of an entire vehicle. The test apparatus 30 is thus easier and more cost-effective to use, allowing testing of a greater number of iterations of an airbag design with fewer resources, while still providing a realistic test for the airbag 34, for example, in terms of measuring and comparing the HIC or BrIC of the anthropomorphic test device 38 produced by different designs of airbags 34.

The linear-motion generator 32 may be deployable in the deployment direction D. The linear-motion generator 32 may be movably connected to the plate 36, as well as to a stabilizing-hook plate 48. The linear-motion generator 32 may move the plate 36 and a stabilizing hook 50 along a straight-line path in the deployment direction D. The linear-motion generator 32 may be a piston, a linear actuator, a compressed-air cylinder, or any other suitable mechanism to move an object along a straight path. Specifically, the linear-motion generator 32 may be a compressed air cylinder utilizing compressed nitrogen, such as is manufactured by Bendix.

Figure 2:
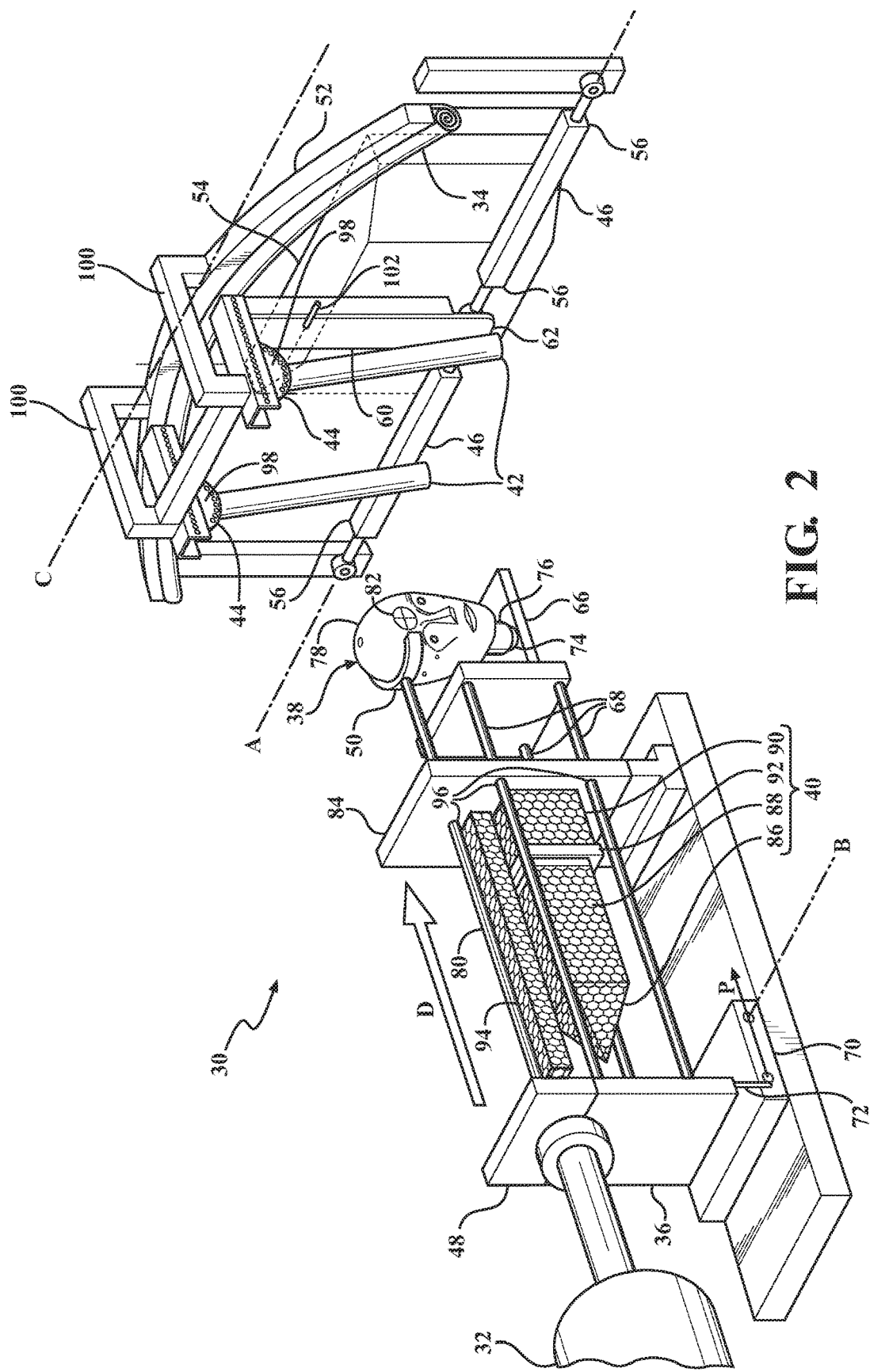
FIG. 2 is another perspective view of the test apparatus.

With reference to FIGS. 1 and 2, the airbag 34 may be spaced from the linear-motion generator 32. As shown in FIGS. 1 and 2, the airbag 34 is a side curtain airbag. The airbag 34 may be any type of airbag, such as a front airbag or a side curtain airbag. The airbag 34 may be attached to an upper beam 52. The airbag 34 is inflatable from an uninflated position to an inflated position.

The airbag 34 may be formed of any suitable airbag material, for example, a woven polymer. For example, the airbag 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The upper beam 52 may be a roof rail of a vehicle or may be a beam simulating a roof rail of a vehicle, for example, having the same size, shape, and/or material as a roof rail of a vehicle. The upper beam 52 may be fixed relative to an impactor 54. The upper beam 52 may be elongated along an axis C transverse to the deployment direction D. The upper beam 52 may be nonparallel with the axis C, as shown in FIGS. 1 and 2, or may be parallel with the axis C. The upper beam 52 may support the airbag 34 and the ends 44 of the guide bars 42.

As set forth above, the ends 44 of the guide bars 42 may be fixed relative to the airbag 34 in the uninflated position. The test apparatus 30 may include a single guide bar 42 or a plurality of guide bars 42. The guide bars 42 may be supported on the upper beam 52 through a bracket 100, as shown in FIGS. 1-4, or may be directly supported on the upper beam 52.

The guide bar 42 may be adjustable relative to the upper beam 52. Specifically, the ends 44 of each guide bar 42 may be adjustable relative to the upper beam 52 to fixed positions along the axis C, and the ends 44 of the guide bars 42 may be pivotally adjustable about the upper beam 52 to fixed positions. When adjusting the ends 44 of the guide bars 42 relative to the upper beam 52 along the axis C, the ends 44 may not necessarily lie on the axis C, and an angle of the guide bars 42 relative to the deployment direction D may be adjusted while remaining transverse. The ends 44 of the guide bars 42 may each include an adjustment plate 98 having a plurality of holes (not numbered) in an arcuate path for receiving a rod 102 for locking the guide bars 42 in the fixed positions relative to the upper beam 52. In the alternative, or in addition, the ends 44 of the guide bars 42 may be, for example, tie rod ends, ball joints, or any other mechanical linkage having sufficient degrees of freedom.

The guide bars 42 may be positioned to intersect the airbag 34 in the inflated position. In other words, when the airbag 34 inflates from the uninflated position to the inflated position, the airbag 34 contacts the guide bars 42, and the guide bars 42 guide the airbag 34 to a particular position.

The test apparatus 30 may include a single beltline bar 46 or a plurality of beltline bars 46, as shown in FIGS. 1 and 2. The beltline bars 46 may be elongated along the axis A transverse to the deployment direction D and may be spaced from each other along the axis A. The beltline bar 46 may be nonparallel or parallel with the axis A, and positions of the beltline bars 46 relative to the deployment direction D may change while remaining transverse. Each beltline bar 46 may be elongated between ends 56 spaced along the axis A, and at least one flexible joint 58 may connect ends 56 of adjacent beltline bars 46. The flexible joint 58 may be, for example, a tie rod end, ball joint, or any other mechanical linkage having sufficient degrees of freedom. The beltline bars 46 are adjacent the airbag 34 in the inflated position and spaced farther from the linear-motion generator 32 than the airbag 34 in the inflated position.

Figure 5:
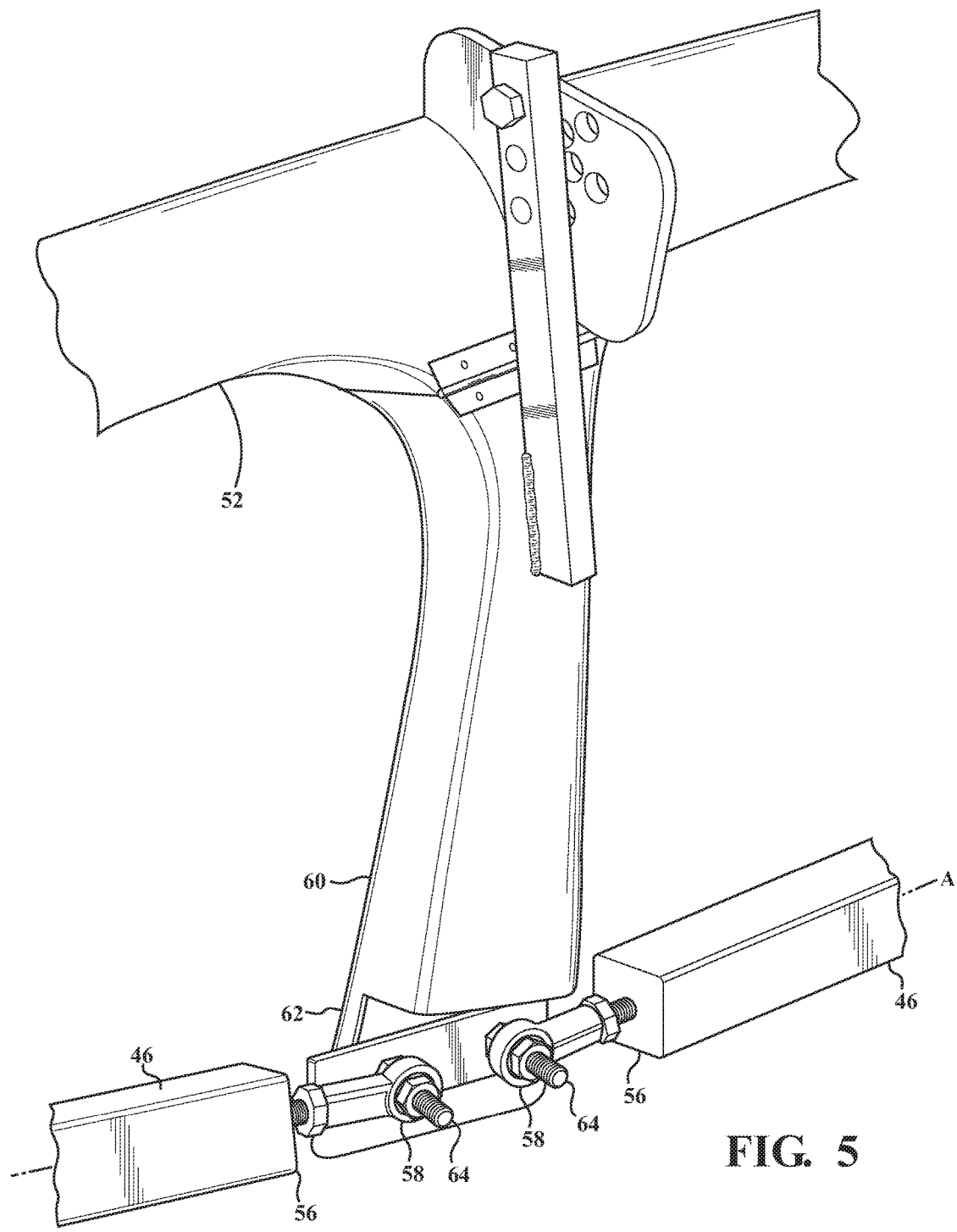
FIG. 5 is a perspective view of a B-pillar beam and portions of beltline bars and upper beams of the test apparatus.

With reference to FIG. 5, a B-pillar beam 60 may be connected to one or more of the beltline bars 46. The B-pillar beam 60 may be elongated transverse to the beltline bars 46. The B-pillar beam 60 may be transverse to the axes A, C and transverse to the deployment direction D. The B-pillar beam 60 may have bolts or pegs 64 at an end 62 to which the flexible joints 58 may connect.

With continued reference to FIGS. 1 and 2, the test apparatus 30 may include the impactor 54. The impactor 54 may support the airbag 34, for example, via the upper beam 52. The impactor 54 may be a moving deformable barrier, such as one conforming to the requirements of testing promulgated by the National Highway Traffic Safety Administration (NHTSA), the Economic Commission for Europe (ECE), the Insurance Institute for Highway Safety (IIHS), or other safety standards. Alternatively, as another example, the impactor 54 may be a rigid object; for example, the impactor 54 may be a rigid vertical pole 10 inches in diameter as used in testing in accordance with FMVSS 214. Further alternatively, the impactor 54 may be left out of the test apparatus 30 if a test run does not need a reaction surface.

The plate 36 may be movable by the linear-motion generator 32 toward the airbag 34. Specifically, the plate 36 may be movable from an initial position, as shown in FIGS. 1-3, to a test position spaced from the airbag 34, as shown in FIG. 4. The plate 36 may be aligned in the deployment direction D with the crushable member 40. The plate 36 may have a flat surface (not numbered) facing toward the crushable member 40. The plate 36 may be rigid relative to the crushable member 40. The plate 36 may be formed of metal, or any other suitable material.

A platform 66 may be fixed relative to the plate 36. The platform 66 may be movable from an initial position, as shown in FIGS. 1-3, to a test position spaced from the airbag 34, as shown in FIG. 4. The platform 66 is movable with the plate 36 in the deployment direction D defined by the linear-motion generator 32. A path along the deployment direction D by the platform 66 from the initial position to the test position may not intersect the impactor 54 or the airbag 34.

With reference to FIGS. 1 and 2, the test apparatus 30 may include guiderails 68. The guiderails 68 may be fixed to the platform 66 and to the plate 36. The guiderails 68 may be cylindrical in shape and extend along the deployment direction D from the plate 36 to the platform 66. The guiderails 68 may fix the platform 66 relative to the plate 36.

With continued reference to FIGS. 1 and 2, a laser sensor 70 may be fixed relative to the linear-motion generator 32 and may have a beam axis B. The laser sensor 70 may be in communication with the airbag 34. The laser sensor 70 may be a retroreflective laser, a spot reflective laser, or any suitable sensor that detects if an object crosses the beam axis B. The beam axis B may be transverse or perpendicular to the deployment direction D.

A sensor-tripping member 72 may be fixed relative to the plate 36 and have a path of travel P. The path of travel P may pass across the beam axis B. The path of travel P may extend in the deployment direction D. The sensor-tripping member 72 may be any suitable object to block a laser beam.

With continued reference to FIGS. 1 and 2, the anthropomorphic test device 38 may be adjacent to the airbag 34, that is, there is nothing between the anthropomorphic test device 38 and the airbag 34. The anthropomorphic test device 38 may be spaced from the airbag 34, for example, before a test is run. The plate 36 and the anthropomorphic test device 38 are movable together by the linear-motion generator 32.

The anthropomorphic test device 38 may be a head-neck complex as shown in FIGS. 1 and 2, for example, ES2re, SID2s, or WorldSID. Alternatively, the anthropomorphic test device 38 may be a full dummy, for example, the Side Impact Dummy (SID), EuroSID, WorldSID, partial versions thereof, or any other suitable dummy.

The anthropomorphic test device 38 may include an end 74 coupled to the platform 66. The anthropomorphic test device 38 may include a dummy neck 76 mounted to the platform 66 and a dummy head 78 fixed to the dummy neck 76.

The dummy neck 76 may be rotatable relative to the platform 66. Specifically, the dummy neck 76 may be rotatable in the deployment direction D. Thus, when the platform 66 moves in the deployment direction D toward the airbag 34 and the impactor 54 and stops short, as shown in FIG. 4, the dummy neck 76 may rotate toward the airbag 34 and/or the impactor 54. The dummy neck 76 may be divided into an upper portion and a lower portion.

The dummy head 78 may be fixed to the dummy neck 76. When the platform 66 moves in the deployment direction D toward the airbag 34 and the impactor 54 and stops short, the dummy head 78 may rotate with the dummy neck 76 toward and possibly contact the airbag 34 and/or the impactor 54.

The stabilizing hook 50 may be adjacent to the dummy head 78. The stabilizing hook 50 may have a semi-circular shape about the dummy head 78. The stabilizing hook 50 may be disposed opposite the deployment direction D relative to the dummy head 78. When the platform 66 accelerates in the deployment direction D, the stabilizing hook 50 may hold the dummy head 78 upright, and when the platform 66 decelerates in the deployment direction D, the stabilizing hook 50 may permit the dummy head 78 to rotate in the deployment direction D.

A stabilizing-hook guiderail 80 may support the stabilizing hook 50. The stabilizing-hook guiderail 80 may be fixed to the stabilizing hook 50 and to the stabilizing-hook plate 48. The stabilizing-hook guiderail 80 may be cylindrical in shape and extend along the deployment direction D from the stabilizing-hook plate 48 to the stabilizing hook 50. The stabilizing-hook guiderail 80 may fix the stabilizing hook 50 relative to the stabilizing-hook plate 48.

The stabilizing-hook plate 48 may be movable by the linear-motion generator 32 toward the airbag 34. The stabilizing-hook plate 48 may be aligned in the deployment direction D defined by the linear-motion generator 32 with a secondary crushable member 94. The stabilizing-hook plate 48 may have a flat surface (not numbered) facing toward the secondary crushable member 94. The stabilizing-hook plate 48 may be rigid relative to the secondary crushable member 94. The stabilizing-hook plate 48 may be formed of metal, or any other suitable material.

A sensor 82 may be supported by the anthropomorphic test device 38. The sensor 82 may be, for example, an accelerometer, a load sensor, and/or a motion sensor. The sensor 82 may be disposed at the center of gravity of the dummy head 78, on the surface of the dummy head 78, or any other suitable location for gathering data. Alternatively, the anthropomorphic test device 38 may support a plurality of sensors 82. The sensors 82 may gather data during a test to determine the forces, moments, velocities, and positions of the anthropomorphic test device 38 during the test. For example, the sensors 82 may be supported by both the upper and lower portions of the dummy neck 76. Sensors 82 may also be supported by the platform 66.

With reference to FIGS. 1 and 2, the test apparatus 30 may include a mount 84. The mount 84 may be disposed between the platform 66 and the crushable member 40. The mount 84 may support the crushable member 40 and the secondary crushable member 94 and may define a bore 96 receiving the guiderail. The bore 96 may slidably receive the guiderail, in other words, the bore 96 may permit the guiderail to slide freely along the deployment direction D. The mount 84 may slidably receive the stabilizing-hook guiderail 80. For example, the mount 84 may define a bore 96 that slidably receives the stabilizing-hook guiderail 80.

The crushable member 40 may be fixed relative to the airbag 34 in the uninflated position. The crushable member 40 may be disposed between the plate 36 and the platform 66; specifically, the crushable member 40 may be disposed between the mount 84 and the plate 36. The crushable member 40 may be fixed to and supported by the mount 84. The crushable member 40 may be disposed in the deployment direction D from the plate 36.

The crushable member 40 may include a plurality of crushable segments 86, 88, 90 having different compressive yield strengths from each other. Thus, when experiencing a load in compression, each of the plurality of crushable segments 86, 88, 90 will fail or yield at a different value of force.

The plurality of crushable segments 86, 88, 90 may be arranged linearly between the plate 36 and the platform 66. The plurality of crushable segments 86, 88, 90 may have different cross-sectional dimensions and lengths from each other.

A panel 92 may be disposed between the plurality of crushable segments 86, 88, 90. For example, the panel 92 may be disposed between the crushable segment 88 and the crushable segment 90.

The crushable member 40 may have a honeycomb structure, that is, a cross-section of the crushable member 40 may have a pattern of polygon tiling, for example, hexagon tiling. A cross-section showing hexagon tiling may run perpendicular to the deployment direction D, or alternatively, a cross-section showing polygon tiling may run parallel or oblique to the deployment direction D. The plurality of crushable segments 86, 88, 90 may each have a honeycomb internal structure. The crushable member 40 may be formed of metal, such as aluminum, or of plastic or foam.

Alternatively, the crushable member 40 may be a programmable hydraulic or pneumatic piston. The crushable member 40 may be programmed to provide resistance that varies according to a time function or according to the position of the crushable member 40.

The secondary crushable member 94 may be disposed between the stabilizing-hook plate 48 and the platform 66; specifically, the secondary crushable member 94 may be disposed between the mount 84 and the stabilizing-hook plate 48. The secondary crushable member 94 may be fixed to and supported by the mount 84. The secondary crushable member 94 may be aligned in the deployment direction D from the stabilizing-hook plate 48. The secondary crushable member 94 may have similar characteristics as the crushable member 40, or the characteristics of the secondary crushable member 94 may be different.

The crushable member 40 may stop movement of the plate 36 toward the airbag 34 when the platform 66 reaches the test position, for example, a position spaced from the impactor 54. The crushable member 40 is disposed along the deployment direction D from the plate 36, so when the plate 36 moves along the deployment direction D, the crushable member 40 may impede the movement of the plate 36, slowing the plate 36. The crushable member 40 may be deformable by the plate 36. Thus, the crushable member 40 may yield before the plate 36 yields.

The secondary crushable member 94 may stop movement of the stabilizing-hook plate 48 toward the airbag 34 before the platform 66 reaches the test position, for example, a position spaced from the impactor 54. The secondary crushable member 94 is disposed along the deployment direction D from the stabilizing-hook plate 48, so when the stabilizing-hook plate 48 moves along the deployment direction D, the secondary crushable member 94 may impede the movement of the stabilizing-hook plate 48, slowing the stabilizing-hook plate 48. The secondary crushable member 94 may be longer than the crushable member 40, so the secondary crushable member 94 may impede the movement of the stabilizing-hook plate 48 before the crushable member 40 impedes the movement of the plate 36. The secondary crushable member 94 may be deformable by the stabilizing-hook plate 48. Thus, the secondary crushable member 94 may yield before the stabilizing-hook plate 48 yields.

As set forth further below, the crushable segments 86, 88, 90 may be designed to simulate the forces on the anthropomorphic test device 38 from a vehicle side impact. For example, the crushable segments 86, 88, 90 may be designed to simulate yielding of components of a vehicle such as a door or frame members that, in the case of a stationary barrier, decelerate the torso of an occupant before the head of the occupant makes contact with an airbag 34 or an impacting structure (or, in the case of a moving barrier, accelerate the torso). The plurality of crushable segments 86, 88, 90 may be designed to sequentially yield, for example, crushable segment 86 may first yield, followed by crushable segment 88, followed by crushable segment 90. Alternatively, crushable segment 86, crushable segment 88, and/or crushable segment 90 may be designed to simultaneously yield.

Figure 6:
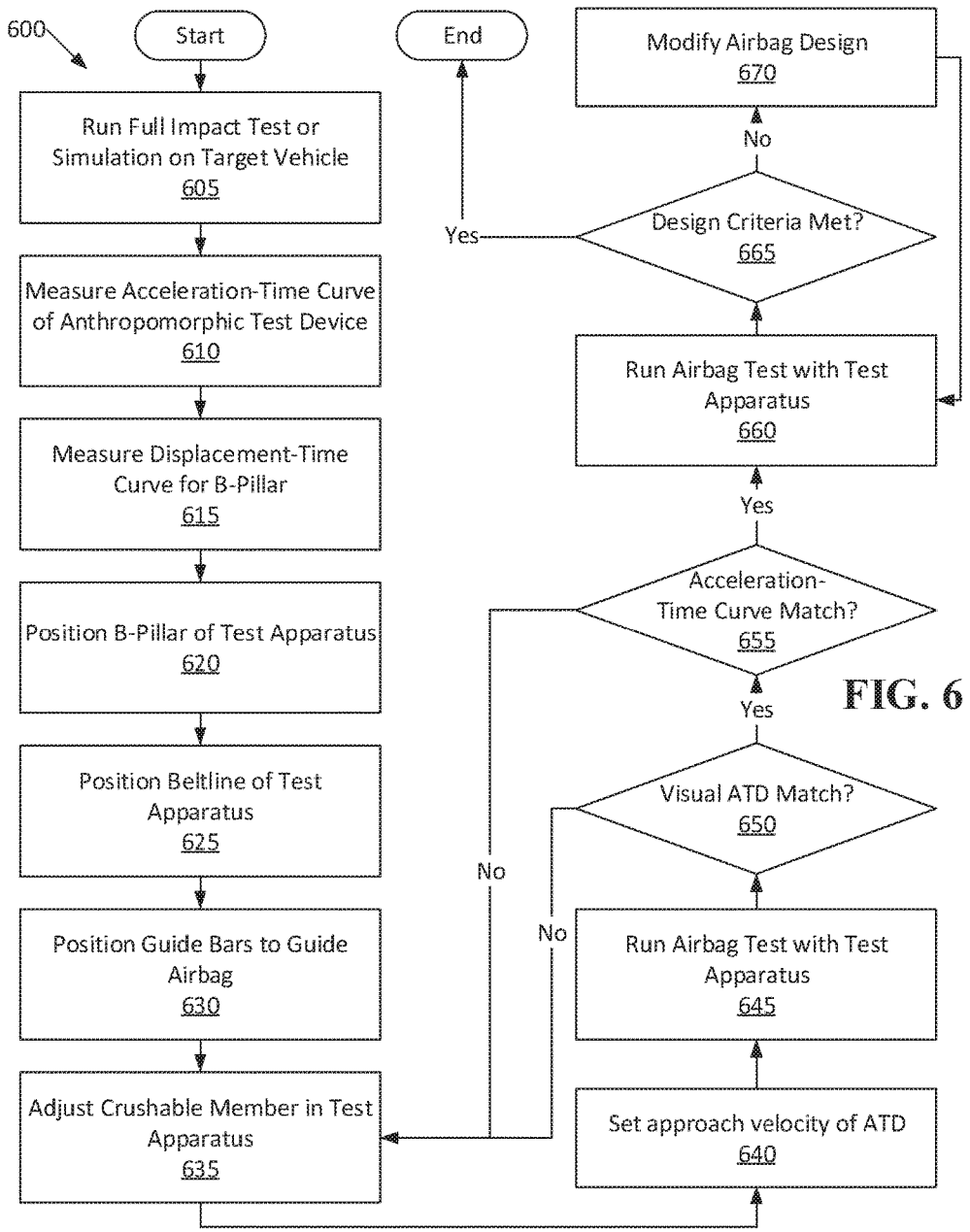
FIG. 6 is a process flow diagram illustrating a process of testing an airbag.

FIG. 6 is a process flow diagram illustrating an exemplary process 600 for testing an airbag 34. The process 600 begins in block 605, in which a full-scale impact test or a simulation of the impact test is run on a vehicle of interest transporting an anthropomorphic test device, e.g., a full-size test dummy. The test may be, for example, a moving deformable barrier test performed according to FMVSS 214. The simulation may use, for example, computer-aided engineering (CAE) methods. The vehicle of interest (not shown) may include a B-pillar, a beltline, and an in-vehicle airbag, e.g., a side curtain airbag. The in-vehicle airbag may be disposed in a roof rail above the B-pillar. The B-pillar may be connected to and transverse to the beltline.

Next, in block 610, the tester measures an acceleration-time curve of the anthropomorphic test device in the vehicle of interest. Specifically, the acceleration-time curve may be the acceleration experienced by a head of the dummy over the duration of the test. The acceleration-time curve may be used to calculate, e.g., the HIC.

Figure 7:
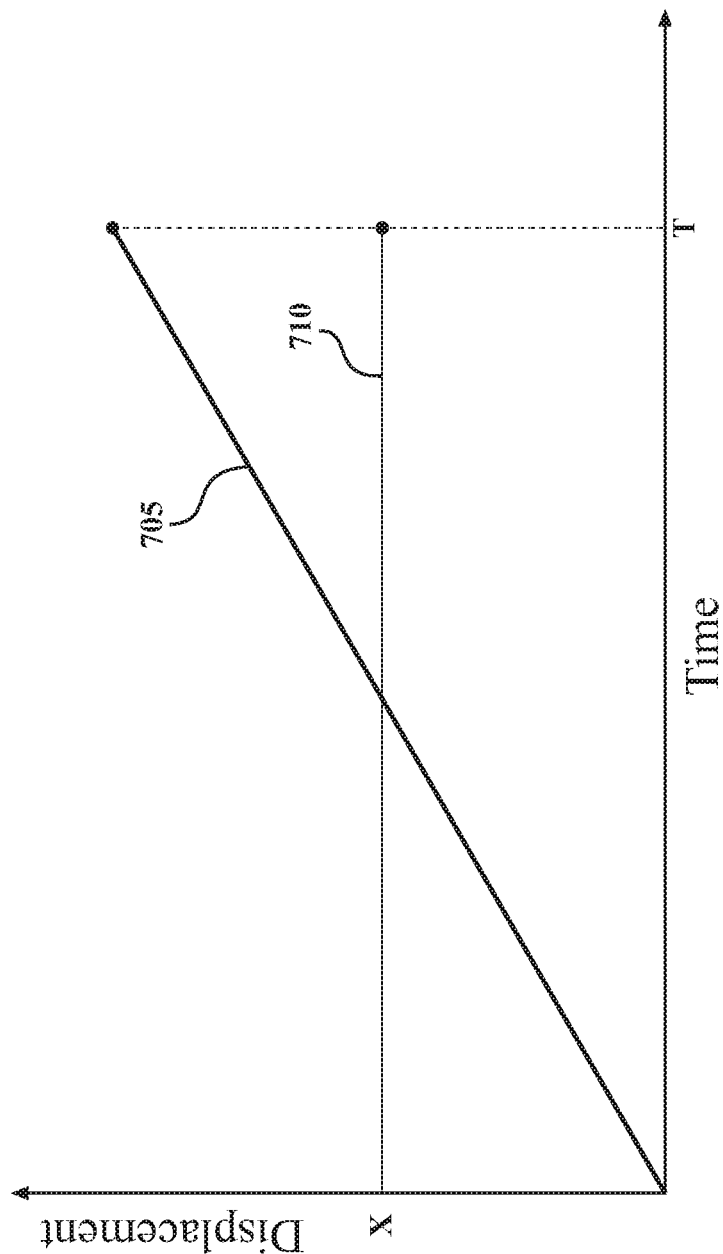
FIG. 7 is a graph of displacement versus time of a B-pillar of an example vehicle.

Next, in block 615, the tester measures a displacement-time curve 705 based on relative displacement of the B-pillar and the in-vehicle airbag versus impact time of the impact test. The displacement of the B-pillar may be a distance traveled by an end of the B-pillar that connects to the beltline during the test. FIG. 7 shows a graph of displacement versus time, and a displacement-time curve 705 represents the intrusion of the beltline over the duration T of the test.

Next, in block 620, the tester positions the B-pillar beam 60 to simulate the B-pillar such that displacement X of the B-pillar beam 60 relative to the airbag 34 of the test apparatus 30 multiplied by the impact time equals an integral of the displacement-time curve 705. In FIG. 7, a line 710 is drawn such that the area under the line 710 during the duration T of the test is equal to the area under the displacement-time curve 705. The line 710 is drawn at the displacement X used for the end 62 of the B-pillar beam 60.

Next, in block 625, the tester positions the beltline bar 46 connected to the B-pillar beam 60. The beltline bar 46 simulates the beltline of the vehicle of interest. The beltline bar 46 is positioned to match the displacement X of the end 62 of the B-pillar beam 60.

Next, in block 630, the tester fixes the ends 44 of the guide bars 42 relative to the airbag 34 and positions the guide bars 42 to guide the airbag 34 during deployment.

Next, in block 635, the tester sizes and positions the crushable member 40. For example, the tester may choose lengths, cross-sectional areas, number, and arrangement of the crushable segments 86, 88, 90. The tester may base the lengths, cross-sectional areas, number, and arrangement of the crushable segments 86, 88, 90 on the acceleration-time curve of the anthropomorphic test device in the vehicle of interest as measured in block 610 and, if the test apparatus 30 has already been run in block 645, on an acceleration-time curve of the anthropomorphic test device 38 of the test apparatus 30.

Next, in block 640, the tester sets an approach velocity for the anthropomorphic test device 38, that is, the speed to which the linear-motion generator 32 accelerates the anthropomorphic test device 38 before the plate 36 contacts the crushable member 40. The approach velocity $V_{ATD}$ may be a function of the velocity $v_{occ}$ of the anthropomorphic test device of the vehicle of interest, the velocity $v_{Bpill}$ of the B-pillar of the vehicle of interest as measured at the roof rail, and the velocity $vb_{belt}$ of the beltline of the vehicle of interest as measured at the B-pillar, that is, $v_{ATD}=f(v_{occ}, v_{Bpill}, v_{belt})$. Specifically, the approach velocity $v_{ATD}$ may be the difference of a weighted average of the velocities $v_{Bpill}$ and $v_{belt}$ and the velocity $v_{occ}$, that is, $v_{ATD}=w*v_{Bpill}+(1-w)*v_{belt}-v_{occ}$, in which w is a number between 0 and 1. If the test apparatus 30 has already been run in block 645, the visual inspection in decision block 650 and the comparison of the acceleration-time curves in decision block 655 (described below) may be used to adjust w.

Next, in block 645, the tester runs a test of the airbag 34 on the test apparatus 30. The tester accelerates the anthropomorphic test device 38 toward the airbag 34. In a test run, the test apparatus 30 may begin in the position depicted in FIG. 3. The linear-motion generator 32 may be triggered, and the linear-motion generator 32 may then accelerate the plate 36 and the stabilizing-hook plate 48 in the deployment direction D. Because the plate 36 may be fixed relative to the platform 66 and the sensor-tripping member 72, the platform 66 and the sensor-tripping member 72 may accelerate in tandem with the plate 36. The stabilizing hook 50, accelerated by the linear-motion generator 32 simultaneous with the platform 66, may hold the dummy head 78 of the anthropomorphic test device 38 upright. After a predetermined distance, the linear-motion generator 32 may cease accelerating the plate 36 and the stabilizing-hook plate 48, and the platform 66 and the stabilizing hook 50 may continue traveling forward by momentum. The stabilizing hook 50 may then strike the secondary crushable member 94. The secondary crushable member 94 may yield and decelerate the stabilizing hook 50. The secondary crushable member 94 may provide sufficient resistance to stop the stabilizing-hook plate 48 and the stabilizing hook 50. The dummy head 78 may remain upright without the stabilizing hook 50 because the dummy head 78 may be traveling at the same velocity as the platform 66. The sensor-tripping member 72 may then cross the beam axis B of the laser sensor 70, tripping the laser sensor 70. The laser sensor 70 may communicate to the airbag 34 to deploy. The airbag 34 may deploy in front of the impactor 54, with the inflated position of the airbag 34 determined by the guide bars 42 as well as the B-pillar beam 60 and the beltline bars 46. At the same time, the plate 36 may strike the crushable member 40. The crushable segments 86, 88, 90 of the crushable member 40, for example, may sequentially yield—first the crushable segment 86, then the crushable segment 88, finally the crushable segment 90. Because each crushable segment 86, 88, 90 has a different compressive yield strength, each crushable segment 86, 88, 90 imparts a different decelerating force to the plate 36. The crushable member 40 may provide sufficient resistance to stop the plate 36. With the platform 66 stopped by the stoppage of the plate 36, the momentum of the dummy head 78 may cause the dummy head 78 to rotate in the deployment direction D into the now-deployed airbag 34 and possibly the impactor 54, depending on the cushioning provided to the dummy head 78 by the airbag 34. FIG. 4 depicts the final position of a test run. Throughout the test run, the sensors 82 supported by the anthropomorphic test device 38 may have recorded data, for example, the acceleration-time curve.

Next, in decision block 650, the tester examines video of the anthropomorphic test device in the vehicle of interest from the full test of block 605 and video of the airbag test of the test apparatus 30 of block 640. The tester visually determines whether the head of the anthropomorphic test device of the vehicle of interest and the anthropomorphic test device 38 of the test apparatus 30 undergo sufficiently similar motion. If the visual inspection shows that the motions are not sufficiently similar, then the process 600 proceeds back to block 635 to adjust the crushable member 40 and/or the weight w determining the approach velocity $V_{ATD}$. The crushable member 40 and/or the weight w may depend on an architecture, tumblehome, size, ride height, etc. of the vehicle of interest.

If the visual inspection shows that the motions are sufficiently similar, next, in decision block 655, the tester compares the acceleration-time curve of the anthropomorphic test device of the vehicle of interest with the acceleration-time curve of the anthropomorphic test device 38 of the test apparatus 30. If the acceleration-time curves are not sufficiently similar, then the process 600 proceeds back to block 635 to adjust the crushable member 40 and/or the weight w determining the approach velocity VATD.

If the acceleration-time curves are sufficiently similar, next, in block 660, the tester runs a test of the airbag 34 on the test apparatus 30, as described above with respect to block 645.

Next, in decision block 665, the tester analyzes whether design criteria for the airbag 34 were met according to the test run in block 660. The design criteria may include, for example, the HIC or BrIC. If the design criteria have been met by the airbag 34, then the process 600 ends.

If the design criteria have not been met, then a design of the airbag 34 is changed. The new airbag 34 is again tested in block 660. While iterating through designs of the airbag 34 in blocks 660, 665, and 670, the setup of the test apparatus 30, including the positioning of the B-pillar beam 60, the beltline bar 46, and the guide bars 42; the characteristics of the crushable member 40; and the approach velocity $V_{ATD}$, does not need to change.

The effect of the test apparatus 30 is to simulate possible head injury of an occupant on the anthropomorphic test device 38 from a vehicle side impact. In a vehicle side impact with an impacting structure, the yielding of components of a vehicle such as a door, a door trim, or frame members decelerate the torso of an occupant before the head of the occupant makes contact with an airbag 34 or the impacting structure. In a vehicle side impact with a moving impacting structure, the impacting structure, via the yielding components, accelerates the torso of the occupant before the head of the occupant makes contact with the airbag 34 or the impacting structure. An appropriate choice of sizes, shapes, and number of crushable segments 86, 88, 90 in the crushable member 40 may mimic the deceleration experienced in a collision. Furthermore, the beltline bars 46 and the B-pillar may mimic the surfaces against which the airbag 34 would react during a collision. The displacement of the B-pillar and/or the beltline bars 46 may statically simulate the effect of the dynamic displacement of the B-pillar and the beltline during a collision. The approach velocity $V_{ATD}$ simulates movement of an occupant relative to a vehicle of interest in a dynamic impact. The test apparatus 30 and the positioning of its components may allow the airbag 34 to be tested more quickly, cost-effectively, and frequently than full-vehicle testing.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A test apparatus comprising:
   a linear-motion generator deployable in a deployment direction;
   an airbag spaced from the linear-motion generator and inflatable from an uninflated position to an inflated position;
   a plate and an anthropomorphic test device movable together by the linear-motion generator;
   a crushable member fixed relative to the airbag in the uninflated position and disposed in the deployment direction from the plate; and
   a guide bar having an end fixed relative to the airbag in the uninflated position, the guide bar being positioned to intersect the airbag in the inflated position.

2. The test apparatus of claim 1, further comprising an upper beam elongated along an axis transverse to the deployment direction, the upper beam supporting the end of the guide bar and the airbag, wherein the end of the guide bar is adjustable relative to the upper beam to fixed positions along the axis.

3. The test apparatus of claim 2, wherein the end of the guide bar is pivotally adjustable about the upper beam to fixed positions.

4. The test apparatus of claim 1, further comprising a second guide bar having an end fixed relative to the airbag in the uninflated position and positioned to intersect the airbag in the inflated position.

5. The test apparatus of claim 4, further comprising an upper beam elongated along an axis transverse to the deployment direction, the upper beam supporting the ends of the guide bar and the second guide bar and supporting the airbag, wherein the ends of the guide bar and the second guide bar are adjustable relative to the upper beam to fixed positions along the axis.

6. The test apparatus of claim 5, wherein the ends of the guide bar and the second guide bar are pivotally adjustable about the upper beam to fixed positions.

7. The test apparatus of claim 1, further comprising a beltline bar elongated along an axis transverse to the deployment direction and adjacent the airbag in the inflated position and spaced farther from the linear-motion generator than the airbag in the inflated position.

8. The test apparatus of claim 1, further comprising a plurality of beltline bars each elongated along an axis transverse to the deployment direction and spaced from each other along the axis, each of the plurality of beltline bars being adjacent the airbag in the inflated position and spaced farther from the linear motion generator than the airbag in the inflated position.

9. The test apparatus of claim 8, wherein each beltline bar is elongated between ends spaced along the axis, and further comprising at least one flexible joint connecting ends of adjacent beltline bars.

10. The test apparatus of claim 1, wherein the plate is moveable from an initial position to a test position spaced from the airbag, the crushable member stopping movement of the plate toward the airbag when the plate reaches the test position.

11. A test apparatus comprising:
a linear-motion generator deployable in a deployment direction;
an airbag spaced from the linear-motion generator and inflatable from an uninflated position to an inflated position;
a plate and an anthropomorphic test device movable together by the linear-motion generator;
a crushable member fixed relative to the airbag in the uninflated position and disposed in the deployment direction from the plate; and
a beltline bar elongated along an axis transverse to the deployment direction and adjacent the airbag in the inflated position and spaced farther from the linear-motion generator than the airbag in the inflated position.

12. The test apparatus of claim 11, further comprising a plurality of beltline bars including the beltline bar, the plurality of beltline bars each elongated along an axis transverse to the deployment direction and spaced from each other along the axis, each of the plurality of beltline bars being adjacent the airbag in the inflated position and spaced farther from the linear-motion generator than the airbag in the inflated position.

13. The test apparatus of claim 12, wherein each beltline bar is elongated between ends spaced along the axis and further comprising at least one flexible joint connecting ends of adjacent beltline bars.

14. The test apparatus of claim 11, wherein the plate is moveable from an initial position to a test position spaced from the airbag, the crushable member stopping movement of the plate toward the airbag when the plate reaches the test position.

15. A method comprising:
measuring a displacement-time curve based on relative displacement of a B-pillar and first airbag of a vehicle versus impact time of an impact test;
positioning a beam of a test apparatus to simulate the B-pillar such that displacement of the beam relative to a second airbag of the test apparatus multiplied by the impact time equals an integral of the displacement-time curve; and
accelerating an anthropomorphic test device toward the second airbag.

16. The method of claim 15, further comprising positioning a second beam connected to the beam, the second beam simulating a beltline.

17. The method of claim 15, further comprising fixing an end of a guide bar relative to the airbag and positioning the guide bar to guide the airbag during deployment.

18. The method of claim 17, further comprising fixing an end of a second guide bar relative to the airbag and positioning the second guide bar to guide the airbag during deployment.

19. The method of claim 15, wherein accelerating the anthropomorphic test device includes accelerating the anthropomorphic test device to an approach velocity that is a difference of a weighted average of velocities of two ends of the B pillar during the impact test and a velocity of an anthropomorphic test device during the impact test.

\* \* \* \* \*